Sept. 10, 1935.  A. BOUSFIELD  2,014,273
WEIGHING SCALE BEAM
Filed March 19, 1931   4 Sheets-Sheet 1

INVENTOR
Alfred Bousfield
BY
ATTORNEY

Sept. 10, 1935.  A. BOUSFIELD  2,014,273
WEIGHING SCALE BEAM
Filed March 19, 1931  4 Sheets-Sheet 2

INVENTOR
Alfred Bousfield
BY
ATTORNEY

Sept. 10, 1935.  A. BOUSFIELD  2,014,273
WEIGHING SCALE BEAM
Filed March 19, 1931  4 Sheets-Sheet 3
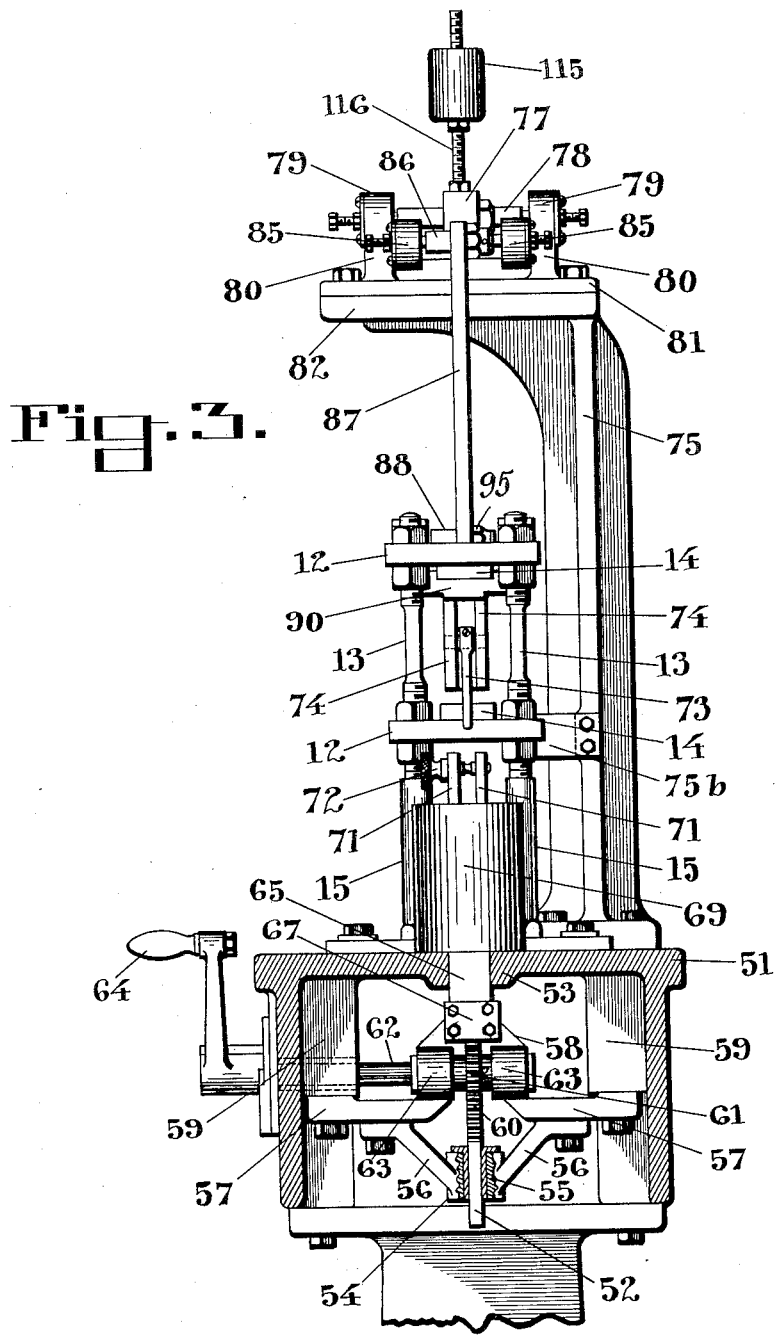
INVENTOR
Alfred Bousfield
BY
ATTORNEY Sept. 10, 1935.                A. BOUSFIELD                 2,014,273
                            WEIGHING SCALE BEAM
                         Filed March 19, 1931        4 Sheets-Sheet 4

INVENTOR
Alfred Bousfield
BY
ATTORNEY

Patented Sept. 10, 1935

2,014,273

UNITED STATES PATENT OFFICE 2,014,273

WEIGHING SCALE BEAM

Alfred Bousfield, St. Johnsbury, Vt., assignor to E. and T. Fairbanks and Company, St. Johnsbury, Vt., a corporation of Vermont Application March 19, 1931, Serial No. 523,804

1 Claim. (Cl. 265—58)

This invention relates to improvements in weighing scale beams and more particularly to the type of beams used on plate-fulcrum track scales, as shown in Patent No. 1,968,988, Plate-fulcrum railroad track scales, Alfred Bousfield, August 7, 1934.

In weigh beams used on scales adapted to weigh heavy loads, such as railroad track scales, on account of the relatively heavy parts employed in the construction of the beam and in its co-operative mechanism, it is important and desirable that the beam be provided with a sensitive mounting which renders the beam quickly and accurately responsive to the movement imparted to the scale mechanism by the load, as well as effective means to aid in operating the beam and to increase the capacity of the beam.

The beam disclosed in the present invention is well designed to fulfill the aforementioned requirements and to perform the functions desired.

Therefore, one of the objects of the invention is to provide the beam with an improved auxiliary balance indicator so arranged and mounted on sensitive bearings and having sensitive connection with the beam that it will respond quickly to the movement of the beam, and accurately indicate the overweight or underweight of the load.

An important object is to provide resilient means for supporting the beam at its fulcrum point by mounting the beam on a plate-fulcrum.

A further important object is to provide the beam with a plate-fulcrum in the butt end, to which depending spaced beam rods are attached.

In order that the nature of my invention may be fully understood, I have illustrated certain embodiments of the invention in the accompanying drawings, in which,—

Figure 3 is a vertical end elevation of the parts shown in Figure 2, partly in section.

Figure 6 is a view of the steadying bracket for the beam rods.

Figure 1:
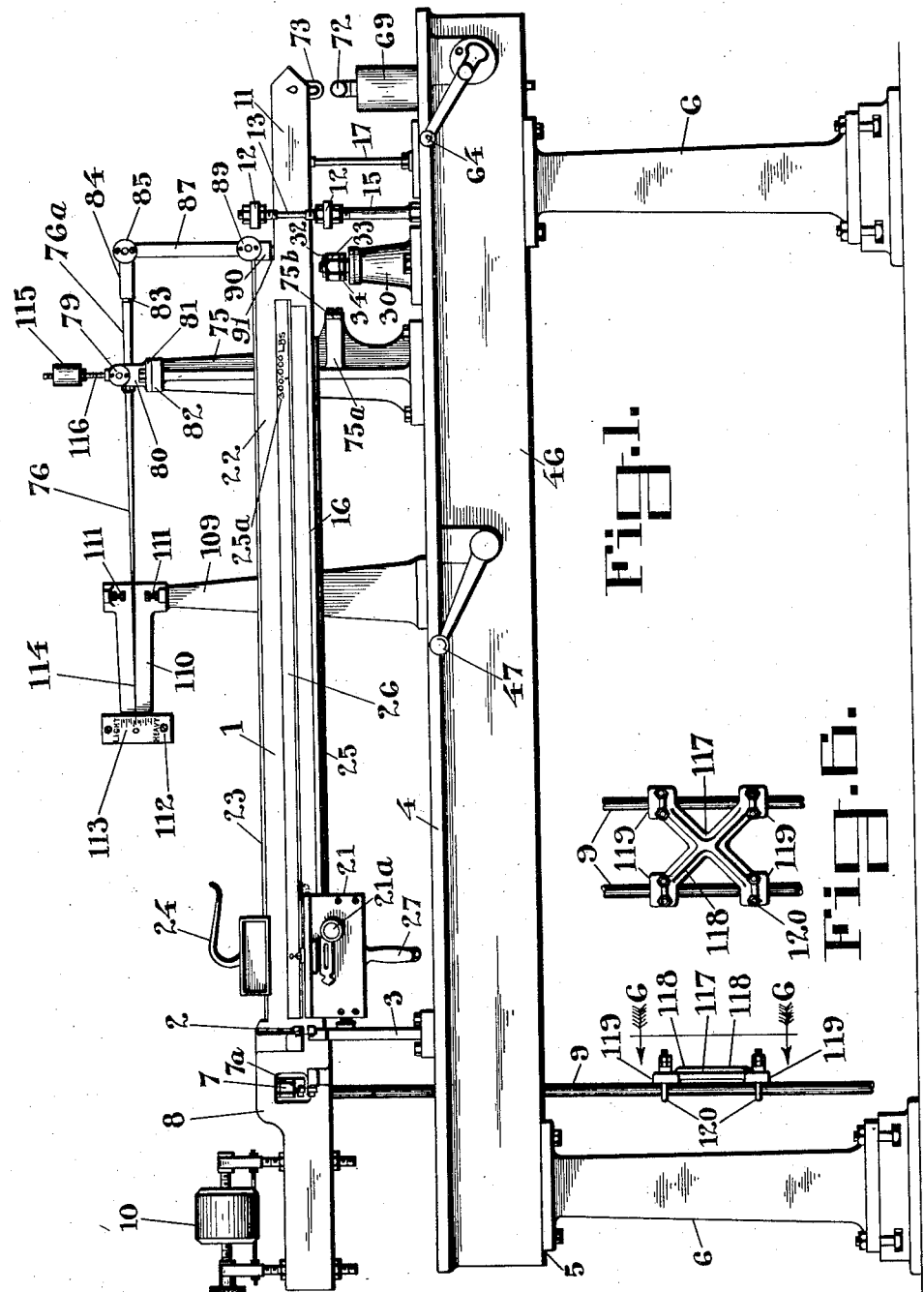
Figure 1 is a longitudinal, front elevation of a weighing scale beam, embodying a preferred form of my invention.
Figure 2:
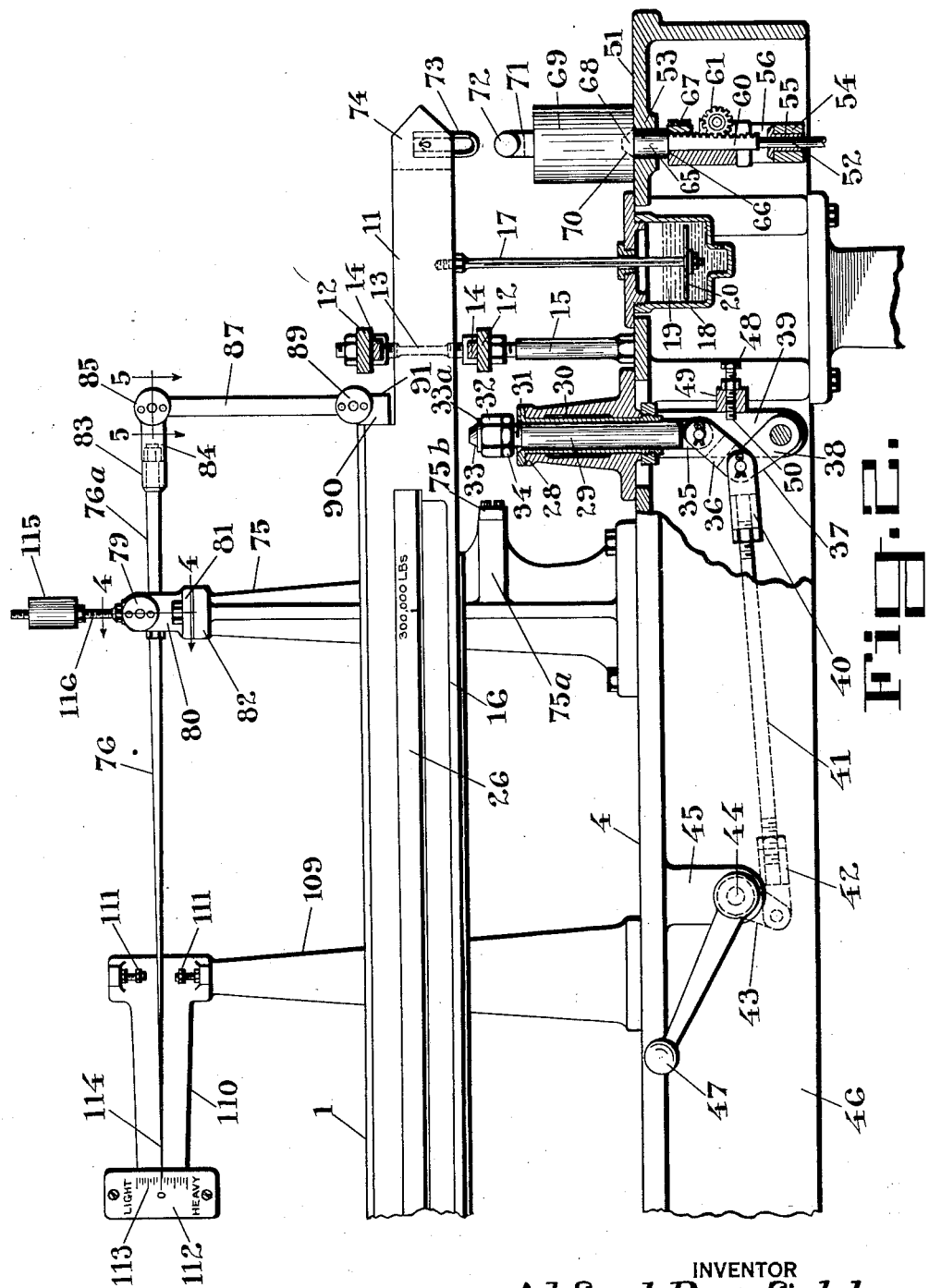
Figure 2 is an enlarged view, of the tip end of the beam, partly in section, showing the beam locking and control mechanism, together with the auxiliary counterbalancing weight operating mechanism and the balance indicator.
Figure 5:
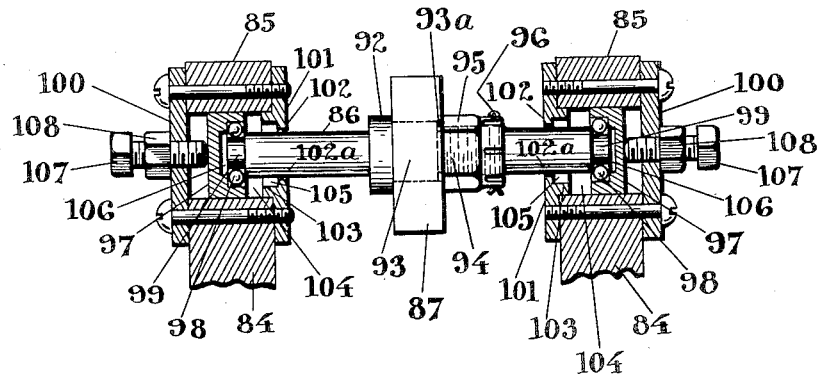
Figure 5 is a cross-section on the line 5—5 of Figure 2 showing the rod mounting disposed with its shaft seated in ball bearings in the butt, forked end of the balance indicator.
Figure 4:
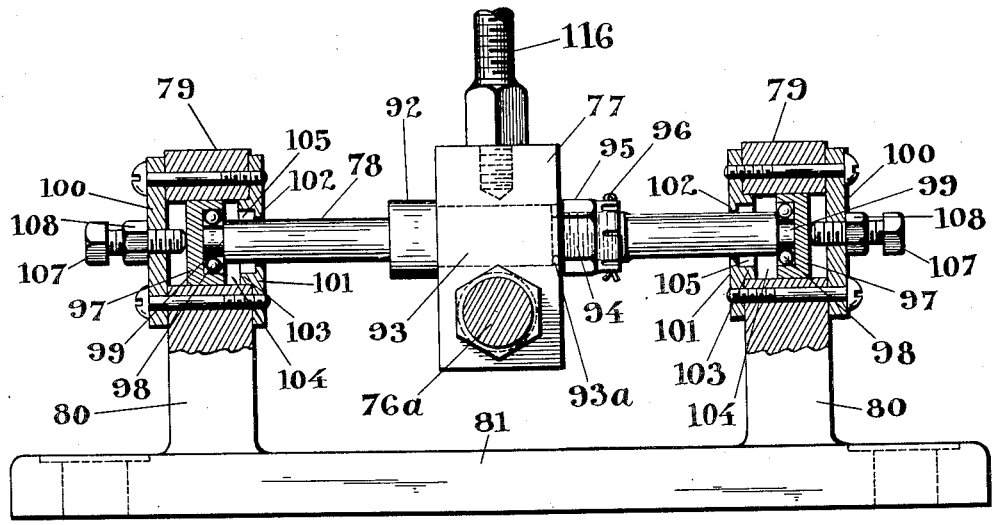
Figure 4 is a longitudinal elevation of the balance indicator mounting, partly in section, on the line 4—4 of Figure 2, showing the shaft journaled in ball bearings.

In the drawings 1 designates the weigh beam of a railroad track scale, which is mounted by a plate-fulcrum 2 on the beam support 3, secured to the shelf 4 of the beam stand 5, which is supported by the pillars 6. Depending from a transversely disposed cross-bar 7 pivotally mounted by a plate-fulcrum in the butt end 8 of the beam 1 are spaced beam rods 9, which are connected to the lever system of the scale. The usual balance ball 10 is provided at the butt end 8 of the beam 1, while at the free end 11 of the beam 1 are disposed spaced beam stops 12 mounted between upright posts 13 and faced with buffer leathers 14, between which the free end 11 of the beam 1 is adapted to move when in operation, the whole structure being adjustably mounted on the spaced stop posts 15, the stops 12 limiting the movement of the beam 1.

Fastened to the lower edge 16 of the beam 1 is a plunger rod 17 extending downwardly into a dash pot 18 containing suitable liquid 19, in which a disk 20 attached to its lower end is adapted to move, whereby any vibratory movement of the beam is damped or retarded.

A type registering poise 21 is slidably mounted on the beam 1, which carries a tare beam operated by the knob 21a while the beam 1 is provided on its upper edge 22 with a toothed rack 23 engaging catch means carried by the poise 21 and operated by the handle 24. The lower edge 16 of the beam is provided with a type bar 25, registering with the graduations 25a on the scale plate 26 and co-operating with printing mechanism carried by the poise 21 and operated by the handle 27.

Located in the shelf 4 adjacent to the stop posts 15 is a beam lock 28, as covered in my divisional application Ser. No. 741,431, Beam locking mechanism for track scales, filed Aug. 25, 1931. The beam lock comprises a movable beam locking rod 29, which is mounted in a tubular standard 30 having a bushing 31 and having adjustably mounted on its upper threaded end a head portion 32. Within the head portion 32 is formed a central frusto-conical opening, in which is inserted a frusto-conical shaped leather buffer 33, held in position by an annular plate 33a fastened by screws to the head portion 32, and adapted to engage the lower edge 16 of the beam. Below the head portion 32 is located a check or lock nut 34 for locking the head portion 32 in position. Thus the position of the head portion 32 and the buffer 33 may be readily adjusted so that the beam end 11 may be securely held between the buffer 33 and the upper beam stop buffer 14, when the beam locking rod 29 is raised to its operative position. The lower end of the rod 29 is provided with a channeled portion 35, on which is pivotally mounted the upper arm 36 of a toggle joint 37, its lower arm 38 being pivoted in the bracket 39. At the jointure of the arms 36 and 38 of the toggle joint 37 a connecting arm 40 is pivotally connected, having one end of a connecting rod 41 secured therein, while the other end is fastened in an arm 42 pivotally mounted on an arm 43 fixedly attached to a shaft 44, mounted in the boss 45 on the front plate 46 of the shelf 4. Attached to the shaft 44 is a handle 47, extending outside the shelf 4, by turning which movement is imparted by the connecting rod 41 and intervening parts 40 and 42 to the arms 36 and 38 of the toggle joint 37 and consequently to the movable beam locking rod 29, in order to raise the rod 29 when it is desired to lock the beam and to lower the rod 29 during a weighing operation. A set screw 48, adjustably mounted in a lug 49 extending laterally from the bracket 39, is adapted to be adjusted so that its threaded end 50 will engage the upper toggle joint arm 36 and thereby control and limit the upward movement of the beam locking rod 29, as well as to prevent the toggle arms 36 and 38 from moving inwardly to a point where they would be rendered inoperative.

In order to provide readily adjustment means for increasing to high capacity the weighing range of the beam there is located at the end 51 of the shelf 2 a counterpoise mechanism, which is covered in my divisional application Ser. No. 741,430, Counterpoise mechanism for track scale beams, filed Aug. 25, 1931. The counterpoise mechanism comprises a lifting rod 52, slidably mounted in a boss 53 in the upper plate of the shelf 4 and a bearing block 54 provided with a bushing 55 and carried by opposed, downwardly inclined arms 56 bolted to the opposed, horizontal arms 57 of a bracket 58, which is secured by bolts to bosses 59 on the side plates of the shelf 4. A portion of the lifting rod 52 is provided with a toothed rack 60, which meshes with a gear 61 secured to a shaft 62, which is trunnioned in spaced bosses 63 on the bracket 58. The shaft 62 extends outside the shelf 4 and has a handle 64 fastened to its outer end. The upper end of the lifting rod 52 is provided with an enlarged end portion 65, the lower face of which rests on the upper side 66 of the bracket 58, in its inoperative position. Mounted above the bosses 63 on the bracket 58 is a transverse guide plate 67 adapted to co-operate with the upper portion 66 of the bracket 68 in holding and guiding the lifting rod 52.

Extending upwardly from the end portion 65 of the lifting rod 52 is a frusto-conical extension or cap 68, upon which rests a relatively heavy counterbalancing weight or counterpoise 69 having in its base a frusto-conical opening 70, into which the frusto-conical cap 68 extends and fits, by which arrangement the auxiliary weight 69 is held securely in a vertical position as it is raised to its operative position. Mounted on the top of the auxiliary weight 69 are two spaced, upright arms 71 provided with a thumb-screw 72 adapted, when the auxiliary weight 69 is raised to its operative position, to be inserted in a loop 73 pivotally mounted in the bifurcated end 74 of the beam 1, thereby attaching the auxiliary weight to the beam. In operation by simply turning the handle 64 the revolving gear 61 engaging the toothed rack 60 causes the lifting rod 52 and hence the auxiliary weight 69 to be easily raised or lowered as desired. This is a desirable and important advantage to enable the operator to quickly increase the capacity of the beam and to mechanically raise and lower a relatively heavy auxiliary weight when desired. The position on the front of the shelf 4 of the handle 47 for controlling the beam lock 28 and the handle 64 for controlling the auxiliary weight 69 operating mechanism renders both controls readily accessible to the operator.

Located back of the beam 1 on a standard 75 attached to the shelf 4 is an auxiliary balance indicator or pointer 76, fixedly mounted on a bearing block 77 secured to a shaft 78, which is journaled in ball bearing units 79 carried by spaced bosses 80 on a standard 81 fastened to an arm 82 extending laterally from the upper end of the standard 75. The butt end 76a of the balance indicator 76 is provided with a forked member 83, in the arms 84 of which are mounted ball bearing units 85 having a shaft 86 journaled therein. Secured to the shaft 86 is a depending rod 87 having its lower end attached to a shaft 88 mounted in spaced ball bearing units 89, carried by the spaced arms of a bracket 90 attached to the inner end of a recess 91 at the free end 11 of the beam. Each shaft 78, 86 and 88 is provided at substantially the center thereof with an annular boss 92 integral therewith, while adjacent thereto is an enlarged, centrally disposed annular bearing portion 93, which has extending therefrom a threaded portion 94. On the bearing portion 93 of each respective shaft 78, 86 and 88 is mounted respectively the bearing block 77 and the upper and lower ends of the depending rod 87. On each threaded portion 94 is mounted a castelated lock nut 95 held in position by a cotter pin 96, for fixedly securing the bearing block 77 and the depending rod 87 to the respective shafts.

It will be noted that, in order to hold the pointer 76 and its bearing block 77 as well as the depending rod 87 in an absolutely fixed position on their respective shafts, the bearing portion 93 is made slightly less in width than the bearing block 77 and depending rod 87, so that a slight space 93a is left intervening between the end of the bearing portion 93 and the lock nut 95. By this arrangement the lock nut 95 may be fastened securely against the bearing block 77 and the depending rod 87 without binding on the adjacent end of the bearing portion 93 and thereby lessening the gripping effect of the lock nut 95 on the bearing portion 77 and the rod 87. The ball bearing units 79, 85 and 89 are each provided with a circular ball container 97 carrying therein ball bearings 98, in which are journaled the reduced ends 99 of the respective shafts 78, 86 and 88.

Outer and inner detachable plates 100 and 101 are secured by screws to their respective units. The inner plate 101 has a central portion 102 having a circular, center opening 102a, through which the shaft 78 or 86 respectively extends, and having its wall provided with an inwardly extending annular portion 103 fitting in a circular opening 104 in the ball bearing unit, the inner plate 102 having also an enlarged center opening 105 for clearance of the shaft, thereby reducing the friction between the shaft and the plate 101. Within the ball containers 97 there is a circular opening 106 larger in diameter than the reduced ends 99 of the shaft so that there will be ample clearance for the ends and hence no friction at those points. Mounted in the outer plates 100 are set screws 107 bearing on the ball containers 97 and adapted to properly adjust the ball containers 97, which are slidable in the circular opening 104, so as to be located in their operative position on the reduced ends 99 of the shafts, when the screws 107 are set by adjusting the lock nuts 108. It is, therefore, evident that the connections between the beam 1 and the balance indicator 76, operating in the ball bearing mountings and with friction therein reduced to a minimum by the particular construction employed, provide readily sensitive and responsive movement to the balance indicator 76 from the beam 1 as it moves under the influence of the load. Spaced from the standard 75 is a standard 109 attached to the shelf 4 and provided at its upper end with a laterally extending arm 110 having at its fixed, inner end two spaced, adjustable stops 111, between which the balance indicator 76 is adapted to move the stops being adapted to check the vibrations of the indicator 76 under influence of the load when it reaches the weigh-bridge (not shown). On the outer end of the arm 110 is located a vertical indicator plate 112 provided with graduations 113, with which the tip end 114 of the balance indicator 76 co-operates, to indicate whether the beam 1 is balancing properly.

In order to provide means for varying the sensitiveness of the beam and co-operating parts, a cylindrical adjustable gravity weight or member 115 is mounted on the auxiliary indicator 76, on a threaded vertical rod 116 fixedly secured to the indicator bearing block 77 and disposed above and in vertical alignment with the fulcrum point of the indicator, whereby the gravity ball 115 may be adjusted to properly regulate the sensitiveness of the beam. Therefore, by moving the gravity ball upwardly the sensitiveness of the indicator is increased and by moving it downwardly its sensitiveness is decreased and the balancing position of the auxiliary indicator varied accordingly.

Below the lower edge 16 of the beam there is located on the support 75 a laterally extending boss 75a, at the end of which is secured an outwardly extending leaf spring 75b, which is adapted to serve as a resilient stop for the poise 21 when it reaches the end of the graduated scale plate 26.

For the purpose of steadying the beam rods 9 and relieving them from vibration, when cars are passing over the weighbridge of the scale and particularly when the beam 1 is in operation, an X-shaped spacing and steadying bracket 117 is mounted on the beam rods 9, having its arms 118 provided with opposed attaching members 119, which are secured by U-bolts 120 to the beam rods 9. By this arrangement the beam rods 9 are steadied at four points and thereby the effect of vibrations on the beam rods 9 and beam 1 are substantially obviated and the efficiency of the beam maintained.

While it is evident that the particular embodiment of my invention as disclosed is well designed to perform the functions defined herein, it is to be understood that the invention is not limited to the type of scale shown, but it may be utilized in different types of scales and modifications may be made that will come within the scope of the invention.

I claim:

Weighing mechanism comprising a weighing beam, sensitive load transmitting means comprising an auxiliary balance indicator mounted on an indicator block carried by a transversely disposed indicator shaft, provided with a forked member at its butt end and fixedly mounted on an indicator shaft located between its tip and butt end, and disposed in spaced bearings, an upper shaft pivotally mounted in spaced bearings in the arms of the said forked member, and a depending rod attached at its upper end to the said upper shaft and at its lower end to a lower shaft pivotally mounted in spaced bearings in a bracket transversely disposed in the free end of the beam all the said bearings being adjustable with relation to the ends of the said co-operating shafts, and each of the said shafts being provided with means for fixedly securing the indicator and depending rod thereto, comprising a central enlarged bearing portion slightly less in width than the indicator block or depending rod, an integral annular boss adjacent to one end of the central bearing portion and a threaded portion adjacent to the other end of the central bearing portion provided with a lock nut, and means for securing the lock nut to the respective shaft.

ALFRED BOUSFIELD.